United States Patent
Taneja (10) Patent No.: US 8,610,410 B2
(45) Date of Patent: Dec. 17, 2013

(54) DUAL DRIVE SYSTEM FOR TRANSFORMER ISOLATED HALF BRIDGE AND FULL BRIDGE FORWARD CONVERTERS

(76) Inventor: Sandeep Taneja, New Delhi (IN)

( * ) Notice: Subject to any disclaimer, the term of this patent is extended or adjusted under 35 U.S.C. 154(b) by 260 days.

(21) Appl. No.: 13/127,286

(22) PCT Filed: Jun. 10, 2010

(86) PCT No.: PCT/IB2010/001391
§ 371 (c)(1),
(2), (4) Date: May 3, 2011

(87) PCT Pub. No.: WO2010/143048
PCT Pub. Date: Dec. 16, 2010

(65) Prior Publication Data
US 2011/0211371 A1   Sep. 1, 2011

(30) Foreign Application Priority Data
Jun. 11, 2009 (IN) .......................... 1202/DEL/2009

(51) Int. Cl.
*G05F 1/16* (2006.01)
(52) U.S. Cl.
USPC ....................................... 323/258; 363/21.04

(58) Field of Classification Search
USPC ................. 363/21.04; 323/255, 257–258
See application file for complete search history.

(56) References Cited

U.S. PATENT DOCUMENTS

2009/0212758 A1 *  8/2009  Asinovski et al. ............ 323/355

FOREIGN PATENT DOCUMENTS

| EP | 0 046 207 | 2/1982 |
| EP | 1 816 735 | 8/2007 |
| WO | 2009/105734 | 8/2009 |

* cited by examiner

*Primary Examiner* — Harry Behm
*Assistant Examiner* — Matthew Grubb
(74) *Attorney, Agent, or Firm* — Maschoff Brennan (57) ABSTRACT

The present invention relates to a power converter circuit for operating on a DC input voltage comprising a forward ferrite-core transformer having at least two primary windings and at least one secondary winding, at least one automatic switching device provided between the primary windings, a current sense circuit provided between the first primary winding and the automatic switching device, and a control unit having a voltage sense circuit, the control unit being connected to the automatic switching device and the current sense circuit and being configured to operate the automatic switch on the basis of an input parameter, thereby controlling the out put voltage.

14 Claims, 7 Drawing Sheets

DUAL DRIVE SYSTEM FOR TRANSFORMER ISOLATED HALF BRIDGE AND FULL BRIDGE FORWARD CONVERTERS

FIELD OF THE INVENTION

The present invention generally relates to Power Converters and particularly to Switch Mode Power Supplies (SMPS).

BACKGROUND OF THE INVENTION

Switch mode power supply (SMPS) circuits are power converters that produce a regulated DC output voltage from an unregulated AC or DC input voltage. The Switch mode power supply is a versatile device that can step up or step down the input voltage to produce a regulated output voltage. There are various applications of the SMPS circuits such as the SMPS may be used for step down an unregulated DC input voltage to produce a regulated DC output voltage, which is known as Buck Converter or Step-Down SMPS. The SMPS may be used for step up an unregulated DC input voltage to produce a regulated DC output voltage is known as Boost Converter or Step-Up SMPS. Further, the same SMPS may also be used for producing multiple regulated DC outputs. The SMPS, which uses an AC, input voltage is known as an offline SMPS. The offline SMPS can be of a forward converter type or a flyback-type. The embodiment of this invention is concerned with the forward converter type of SMPS.

The forward converter type offline SMPS circuit may have a half bridge or a full bridge configuration. A half bridge power converter circuit comprises a transformer with a single primary winding coupled to one or more secondary windings and two switching elements such as Field Effect Transistors (FET) or bipolar transistors or insulated gate bipolar transistors (IGBTs) as connected in a half bridge configuration i.e. one out of the two transistors is "on" at a time and thus, the two transistors conduct on alternate half cycles at a time. These two transistors are connected to one end of the primary winding. The other end of the primary winding is connected to the junction of two equal capacity capacitors connected in series, with the DC input voltage $V_{dc}$. The junction of the capacitors presents half the DC input voltage to the primary winding end connected to the capacitors, ie $V_{dc}/2$.

Further, a full bridge power converter circuit has two additional transistors that are provided in place of the capacitors placed in a half bridge configuration. The four transistors are connected in a bridge configuration, wherein the two diagonally opposite transistors are switched "on" simultaneously during alternate half cycles. As a result, the full DC input voltage is applied across the transformer primary winding i.e. $V_{dc}$ wherein $V_{dc}$ is DC input voltage. Thus, the total power yielded in a full bridge configuration is twice that of the half bridge configuration.

The half bridge and the full bridge configurations may be used with an SMPS circuit as discussed above. However, the known SMPS circuits have a major limitation that they can operate only in a limited range of input voltage. This limited varying input voltage operating range for a switch mode power supply forces the consumers of domestic products such as: computers, television receivers, industrial equipments etc. to use additional power conditioning equipment and uninterrupted power supply (UPS). The additional power conditioning equipment adds to cost and additional power consumption. Therefore, there is an utmost need to improve the efficiency and reliability of SMPS in terms of increasing the input voltage range.

The subject matter claimed herein is not limited to embodiments that solve any disadvantages or that operate only in environments such as those described above. Rather, this background is only provided to illustrate one exemplary technology area where some embodiments described herein may be practiced.

SUMMARY OF THE INVENTION

The present invention discloses a power converter circuit. The circuit comprises a ferrite-core forward type transformer, at least one automatic switching device, a current sense circuit and a control unit. The ferrite-core forward type transformer has at least two primary windings and at least one secondary winding. The automatic switch is provided between the two primary windings. The current sense circuit is provided between the first primary winding and the automatic switching device. The control is connected to the automatic switch and the current sense circuit. The control unit is configured to operate the automatic switching device based on an input voltage detected by the control unit in the input of the power converter circuit and an input current of the current sense circuit.

Further, the present invention discloses a method of controlling the output voltage of a power converter circuit having a ferrite-core forward type transformer having a main primary winding, at least one auxiliary primary winding and at least one secondary winding. The method comprises the step of obtaining an input voltage at the main primary winding. Further, the method comprises the step of controlling the connection between the main primary winding and the auxiliary primary winding based on the input voltage, such that voltage per turn ratio on the one or more secondary windings remains constant.

Additional features of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF DRAWINGS

To further clarify the above and other advantages and features of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention describes an improved power converter circuit. The disclosed circuits enhance the dynamic voltage operating range for a power converter such as a Switch Mode Power Supplies (SMPS) and thus deliver better reliability and higher overall efficiency in the circuits.

The various embodiments described in the present invention work on selectively controlling the number of turns on a primary side of a forward transformer of a power converter circuit such that the voltage per turn ratio on a secondary side remains constant in spite of a large change in the input line conditions. For selectively controlling the number of turns, an automatic switching device may be provided for varying the number of primary turns of the forward transformer with variation in the applied input DC voltage. According to an embodiment, the forward transformer implemented here particularly consists of a Ferrite core, unlike the iron core transformers used in AC circuits. According to another embodiment, the forward transformer has at least two primary windings. Out of the multiple primary windings, one primary winding is main primary winding and others windings are auxiliary primary windings. The main primary winding and the auxiliary primary windings may be connected in series incase the number of primary turns is required to be enhanced.

According to an embodiment, the primary windings may be connected in series by an automatic switching device. The automatic switching device may be an electromechanical or semiconductor operated switching arrangement. According to yet another embodiment, the switching device may be a relay, which is electromechanical in nature. Further, a control unit may be provided that controls various operations of the SMPS including that of the automatic switching device.

In case, the applied input DC voltage is below a specific threshold, then current is driven only through the main primary winding. However, when the applied DC voltage goes above the specific threshold, the switching device automatically connects the auxiliary primary winding in series with the main primary winding, thus increasing the total number of primary turns. The increase in number of turns maintains the volts per turn ratio constant. Further, the increase in primary turns of the transformer allows the magnetic flux density excursions to be reduced at high input voltages and thus, ensures that the ferrite core of the transformer does not reach the saturation stage.

According to an embodiment, the auxiliary primary winding may be driven by a drive circuit that is used for driving current through the main primary winding, which is known as single drive architecture. According to yet another embodiment, the auxiliary primary winding and the main primary winding may be driven by separate drive circuits, which is known as dual drive architecture.

Figure 1:
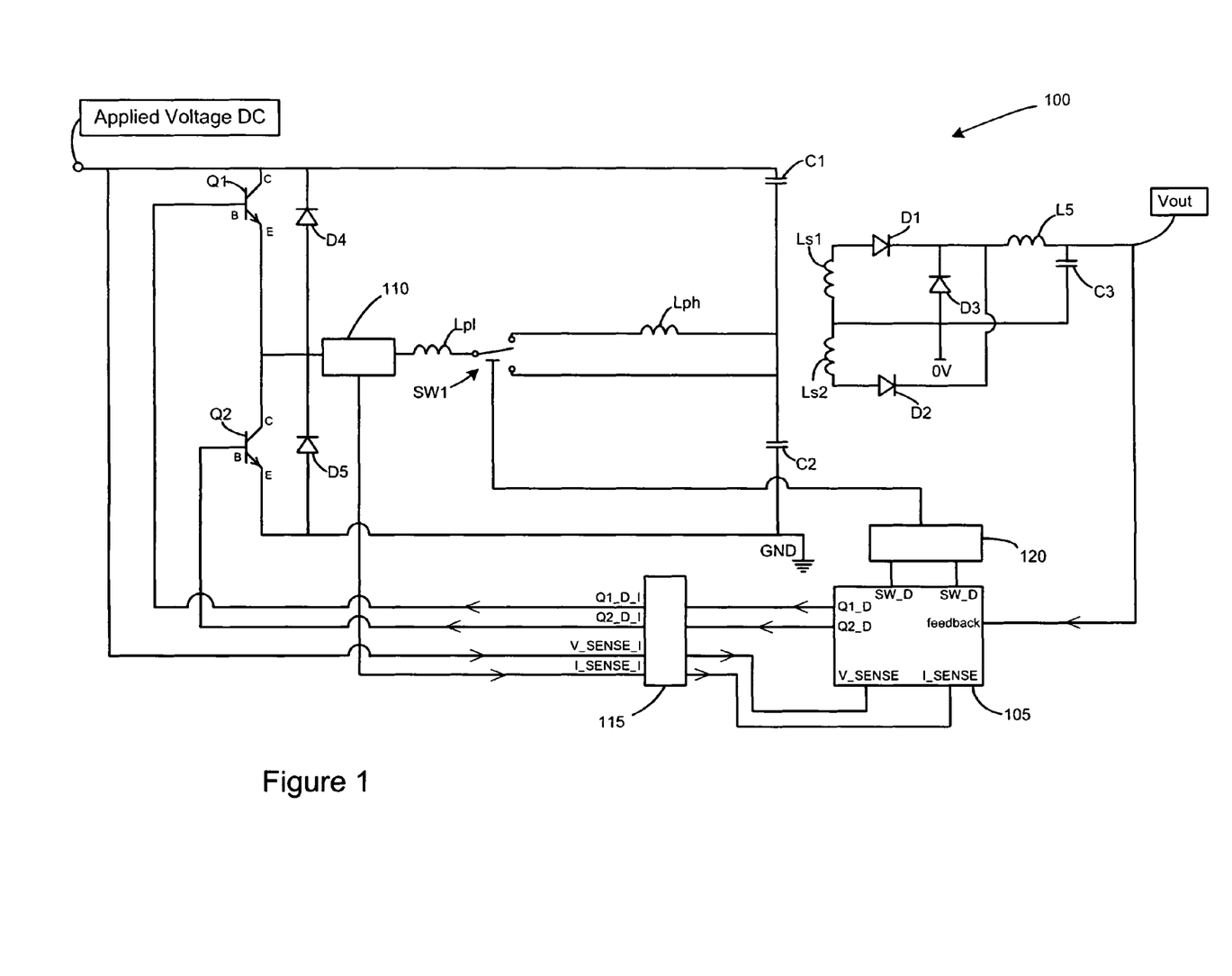
FIG. 1 illustrates a single drive half bridge circuit for SMPS according to an embodiment of the present invention.

The present invention will now be explained with regard to exemplary SMPS circuits. FIG. 1 illustrates a single drive half bridge circuit 100 according to an embodiment of the present invention. The circuit 100 comprises at least two switching elements Q1 and Q2, a ferrite-core forward type transformer having a main primary winding Lpl, an auxiliary primary winding Lph and at least one secondary winding, a plurality of capacitors C1, C2 and C3, an automatic switching device SW1 and a control unit 105. The circuit 100 may further be divided into a primary side and a secondary side, wherein the primary windings of the transformer may be configured on the primary side of the circuit and the secondary windings of the transformer may be configured on the secondary side of the circuit. The secondary side may further comprise a plurality of diodes D1, D2 and D3, inductor L5 and capacitor C3, which forms the secondary side rectification and LC filtration circuit. According to an embodiment of the present invention, the secondary side of the circuit may have two secondary windings Ls1 and Ls2.

In one switching cycle of the single drive half bridge circuit 100, the switching element Q1 is "on" and the current flows from the switching element Q1 to the main primary winding Lpl to the second capacitor C2. In the subsequent switching cycle, the switching element Q2 is "on" and the current flows from the capacitor C1 to the main primary winding Lpl to the switching element Q2.

According to yet another embodiment, the switching elements Q1, Q2 may be selected from a group comprising a Field Effect Transistor (FET), Insulated Gate Bipolar Transistor (IGBT) or bipolar transistor.

According to yet another embodiment, the control unit 105 is configured to receive a voltage sense input V_SENSE. The voltage sense input V_SENSE, senses the DC input voltage applied to the circuit 100. The control unit 105 is configured to control the operation of the automatic switching device SW1 based on the voltage sense input V_SENSE, hence the voltage sense input V_SENSE works as an input parameter for controlling the working of the circuit 100.

The control unit 105 is further configured to generate pulse width modulated outputs so as to drive the switching elements Q1 and Q2 via the output drive signals Q1_D and Q2_D. According to yet another embodiment, the control unit 105 may be configured to receive feedback signal from the secondary side of the circuit 100. The control unit 105 controls the operation of the switching elements Q1, Q2 based on the line and load conditions parameters received from the voltage sense input V_SENSE and the feedback signal.

According to yet another embodiment, a switch drive circuit 120 may be provided in signal communication with the control unit 105. The switch drive circuit 120 is configured to operate the automatic switching device SW1 based on one or more output signals SW_D received from the control unit 105.

According to yet another embodiment, a current sense unit 110 may be provided on the primary side of the circuit 100. The current sense unit 110 is provided to detect the current flowing through the core of the ferrite-core transformer. Before connecting or disconnecting the auxiliary primary winding Lph to the main primary winding Lpl, the core is required to be reset to zero, hence the core should be at the residual flux level. The current flowing through the core may be sensed in both the directions through a current sense input I_SENSE received from the current sense unit 110, which is sent to the control unit 105 via the isolation barrier unit 115. To ensure that the current through the core is zero, the control unit 105 may provide a reset pulse to the transformer core prior to connecting or disconnecting the auxiliary primary winding Lph. Hence, the current sense input I_SENSE works as an input parameter for controlling the working of the automatic switching device SW1.

The control unit 105 keeps the automatic switching device SW1 connected to the junction of the capacitors C1 and C2, until the DC input voltage remains below a particular threshold, detected via the voltage sense input V_SENSE such that only the main primary winding Lpl may be driven by the switching elements Q1 and Q2.

According to yet another embodiment, when the input DC voltage goes above a particular threshold, detected via the voltage sense input V_SENSE, the control unit 105 operates the switching device SW1 so as to connect the main primary winding Lpl with the auxiliary primary winding Lph in series. The current in this case may flow through the series connected primary windings Lpl+Lph, and thereby increasing the number of turns on the primary side.

According to yet another embodiment, an isolation barrier unit 115 may be provided in the circuit 100. The isolation barrier unit 115 may be provided on the primary side or on the secondary side of the circuit 100 and is in communication with the control unit 105. The isolation barrier unit 115 is provided on the primary side when the control unit 105 is provided on the secondary side of the circuit 100 and vice versa, the isolation barrier unit 115 is provided on the secondary side of the circuit 100 when the control unit 105 is provided on the primary side of the circuit 100.

According to an embodiment the isolation barrier unit 115 may be provided on the primary side of the circuit 100. When the isolation barrier unit 115 is provided on the primary side then the voltage sense input V_SENSE, the current sense unit 110 and the switching elements Q1 and Q2 are connected to the control unit 105 through the isolation barrier unit 115. The drive signals Q1_D and Q2_D for driving the switching elements Q1, Q2 from the control unit 105 are isolated and sent via the isolation barrier unit 115 to their respective drive elements as isolated signals Q1_D_I and Q2_D_I. The isolation barrier unit 115 may further receive the isolated current sense signal I_SENSE_I and isolated voltage sense signal V_SENSE_I from the primary side of the circuit 100 and forwards the isolated signals to the current sense input I_SENSE and voltage sense input V_SENSE of the control unit 105.

According to yet another embodiment, the isolation barrier unit 115 may be provided on the secondary side of the circuit 100. When the isolation barrier unit 115 is provided on the secondary side then the drive signals Q1_D and Q2_D for driving the switching elements Q1, Q2 are directly sent from the control unit 105. Further the current sense input I_SENSE and the voltage sense input V_SENSE are directly received at the control unit 105. However the isolation barrier unit 115 isolates the feedback signal received from the secondary side of the circuit 100 and an isolated feedback signal is provided to the control unit 105.

According to yet another embodiment an isolation barrier unit 115 may also be required for the switch drive circuit 120, depending on the type of automatic switching device SW1 employed in the circuit 100. However in case, the switching device SW1 is a relay, the drive signal SW_D from the control unit 105 is not required to be isolated.

According to yet another embodiment, one or more diodes D4, D5 may be provided on the primary side of the circuit 100, such that at least one diode is provided along with each switching elements Q1, Q2. The diodes D4, D5 are provided to protect the switching elements Q1, Q2 from back flow of current from the primary windings of the transformer.

Figure 2:
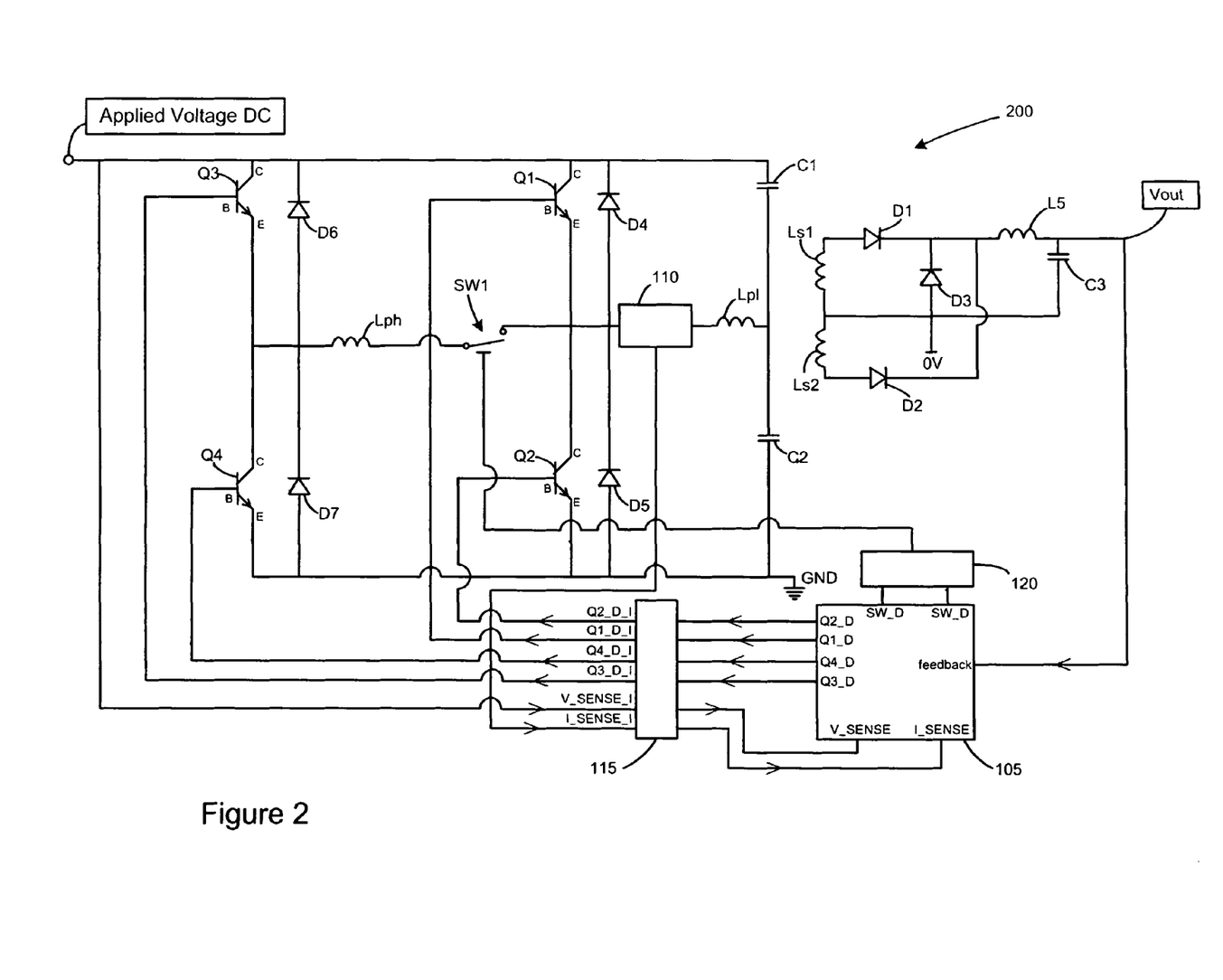
FIG. 2 illustrates a dual drive half bridge circuit for SMPS according to another embodiment of the present invention.

FIG. 2 illustrates a dual drive half bridge circuit 200 according to an embodiment of the invention. The dual drive circuit 200 may have two additional switching elements Q3 and Q4 in addition to the components required in a single drive half bridge circuit 100 as illustrated in FIG. 1 above. In the dual drive configuration, the drive circuits for the single primary winding i.e. main primary winding Lpl and the combined primary windings i.e. main primary winding Lpl+auxiliary primary winding Lph are separate. In this configuration, the control unit 105 generates pulse width modulated outputs so as to drive the switching elements Q1, Q2, Q3 and Q4, via output drive signals Q1_D, Q2_D, Q3_D and Q4_D, depending on the line and load conditions that are sensed. Further, the control unit 105 may provide over-voltage and under-voltage protection on all the regulated DC outputs using the feedback signal from the secondary side of the transformer.

According to an embodiment of the present invention, when only the main primary winding Lpl is working i.e. when the voltage sense input V_SENSE is below a particular threshold, the current flow is from the switching element Q1 to main primary winding Lpl to second capacitor C2 and in the subsequent switching cycle, the current flow is from the first capacitor C1 to main primary winding Lpl to the switching element Q2.

According to another embodiment of the present invention, when a series combination of auxiliary primary winding Lph and main primary winding Lpl is being driven, connected via switching device SW1, i.e. when the voltage sense input V_SENSE is above a particular threshold, the current flows from switching element Q3 to auxiliary primary winding Lph+main primary winding Lpl to second capacitor C2 and, subsequently from first capacitor C1 to main primary winding Lpl+auxiliary primary winding Lph to switching element Q4 in the next cycle. The main advantage of this configuration lies in that the drive stages of Lpl and Lpl+Lph are effectively isolated from one another. Thus, the switching elements Q1, Q2, Q3 and Q4 can be of different current and voltage ratings resulting in lower switching losses.

The current sense unit 110 may provide the current sense input I_SENSE indicating the current flowing through the primary windings Lpl or Lpl+Lph to the control unit 105. Using the current sense input I_SENSE, the control unit 105 provides current limiting on the primary side and ensures that the ferrite core of the transformer is reset prior to the primary windings Lpl, Lph being switched.

According to yet another embodiment of the present invention, the isolation barrier unit 115 receives the switching elements output drive signals Q1_D, Q2_D, Q3_D and Q4_D from the control unit 105 and forwards the isolated signals Q1_D_I, Q2_D_I, Q3_D_I and Q4_D_I to their respective switching elements Q1, Q2, Q3 and Q4, when the control unit 105 is provided on the secondary side. The current and voltage inputs from the primary side of the circuit I_SENSE_I and V_SENSE_I may be sent to the current and voltage sense inputs I_SENSE and V_SENSE of the control unit 105 via the isolation barrier unit 115.

Figure 3:
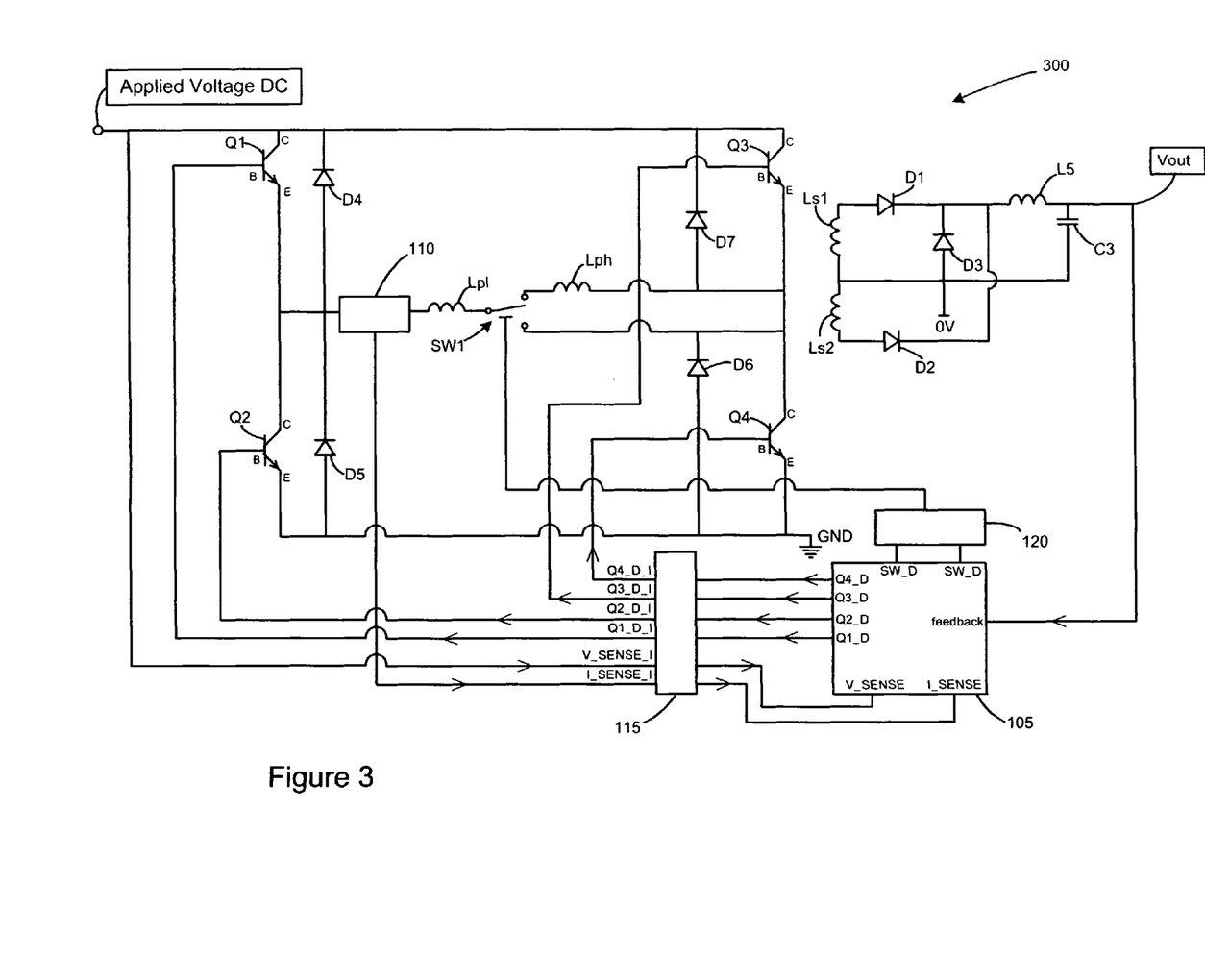
FIG. 3 illustrates a single drive full bridge circuit for SMPS according to an embodiment of the present invention.

FIG. 3 illustrates a single drive full bridge circuit 300 according to an embodiment of the present invention. The single drive full bridge circuit 300 is similar to the single drive half bridge circuit 100 as illustrated in FIG. 1, except that the two switching elements Q3 and Q4 replace the capacitors C1 and C2. The switching elements Q1, Q2, Q3 and Q4 are provided for driving both the primary windings Lph and Lpl. In this configuration, the switching elements Q1 and Q4 are "on" simultaneously for one switching cycle. For the next switching cycle, the switching elements Q3 and Q2 are "on" simultaneously. As compared to the half bridge configuration as illustrated in FIG. 1 and FIG. 2, the current drive requirements of the switching elements Q1 to Q4 are halved in this case.

According to an embodiment, when the voltage sense input V_SENSE is below a particular threshold, only the main primary winding Lpl is driven by the combination of switching elements Q1, Q4 and Q3, Q2. The switching device SW1 in this case connects the main primary winding Lpl to the junction of the switching elements Q3 and Q4. In the circuit 300, the current flows from the switching element Q1 to the main primary winding Lpl to the switching element Q4 in one switching cycle and from the switching element Q3 to the main primary winding Lpl to the switching element Q2 for the subsequent switching cycle. When the voltage sense input V_SENSE goes above a particular threshold, then the switching device SW1 connects the primary windings Lpl and Lph in series. In the subsequent switching cycle, the current flow is the same but with the primary windings Lpl and Lph connected in series. The current sense input I_SENSE provides the current flowing through the primary windings Lpl or Lpl+Lph to the control unit 105. The control unit 105 is configured to receive the input parameters feedback from the secondary outputs, and accordingly generate pulse width modulated output drive signals Q1_D, Q2_D, Q3_D and Q4_D for the switching elements Q1, Q2, Q3 and Q4. Further, the control unit 105 may provide over-voltage and under-voltage protection on all the regulated DC secondary outputs by receiving the input feedback parameters. Using the current sense input I_SENSE received from the current sense unit 110, the control unit 105 provides primary side current limiting and ensures that the ferrite core of the transformer gets reset prior to the automatic switching device SW1 connecting the main primary winding Lpl with the auxiliary primary winding Lph.

According to yet another embodiment of the present invention, the isolation barrier unit 115 isolates and drives the signals Q1_D_I, Q2_D_I, Q3_D_I, Q4_D_I, from the respective switching element output drive signals Q1_D, Q2_D, Q3_D and Q4_D, when the control unit 105 is provided on the secondary side. The primary side inputs for current and voltage I_SENSE_I and V_SENSE_I are sent via the isolation barrier unit 115 to the current and voltage sense inputs I_SENSE and V_SENSE of the control unit 105.

Figure 4:
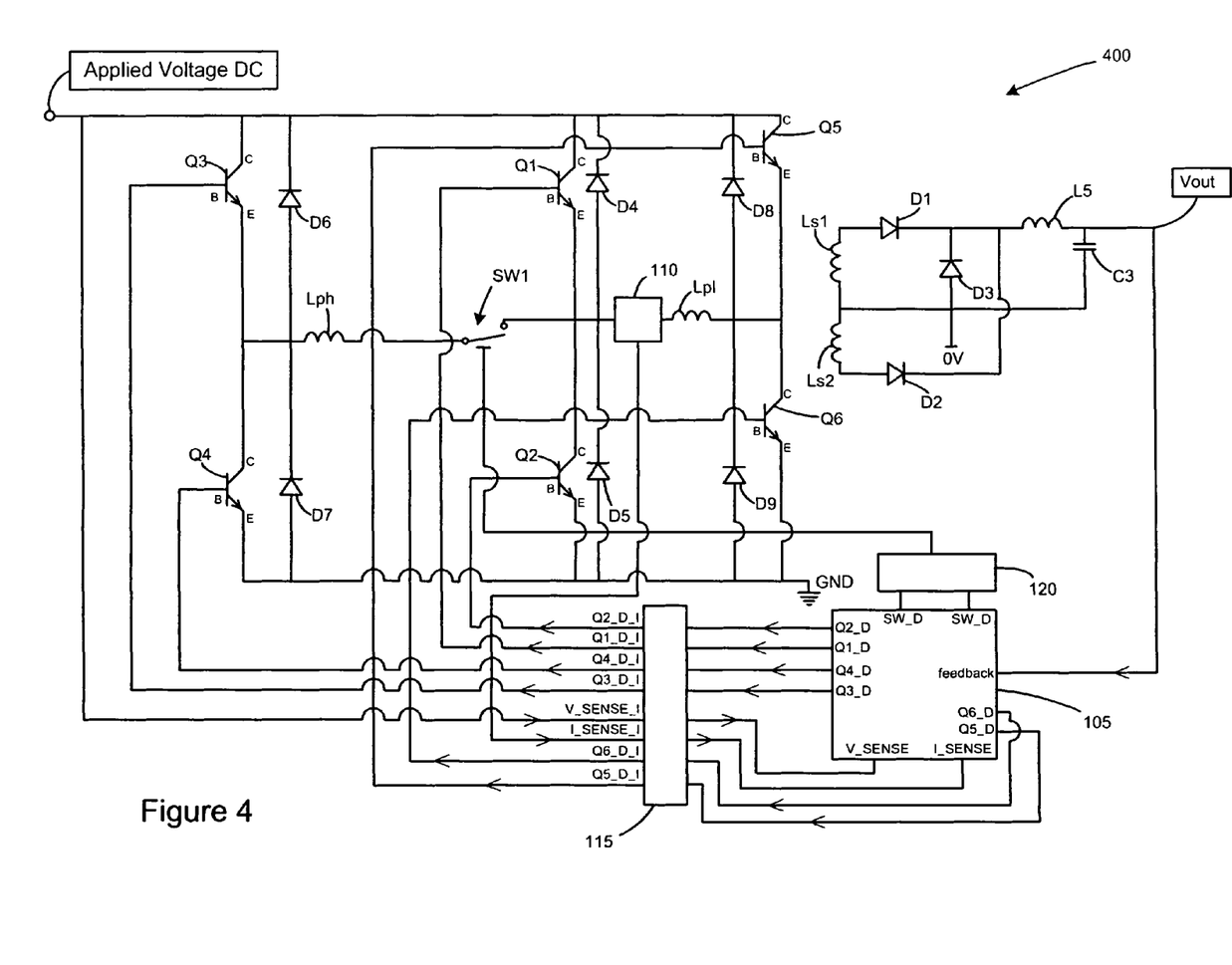
FIG. 4 illustrates a dual drive full bridge circuit for SMPS according to yet another embodiment of the present invention.

FIG. 4 illustrates a dual drive full bridge circuit 400 according to an embodiment of the present invention. The dual drive full bridge circuit 400 is different in a manner that two more switching elements Q5 and Q6 are added to the single drive full bridge circuit 300 as described in FIG. 3. The remaining elements of the circuit 400 are the same as described in figures above. In this configuration, the control unit 105 generates pulse width modulated outputs so as to drive the switching elements Q1, Q2, Q3, Q4, Q5 and Q6 via the drive signals Q1_D, Q2_D, Q3_D, Q4_D, Q5_D and Q6_D depending on the line and load conditions that have been sensed. Further, the control unit 105 may provide over-voltage and under-voltage protection on all the output supplies by receiving input parameters feedback from the secondary side.

According to an embodiment, when only the main primary winding Lpl is being used, the current flows from the switching element Q1 to the main primary winding Lpl to the switching element Q6 and in the subsequent switching cycle from the switching element Q5 to the main primary winding Lpl to the switching element Q2. When the series connected primary windings Lph+Lpl is being used, connected via the switching device SW1, the current flows from the switching element Q3 to the primary windings Lph+Lpl to the switching element Q6 and in the subsequent switching cycle, the current flows from the switching element Q5 to the primary windings Lpl+Lph to the switching element Q4. The current sense input I_SENSE from the current sense unit 110 provides the current flowing through the primary windings Lpl or Lpl+Lph to the control unit 105. Using the current sense input I_SENSE, the control unit 105 provides the primary side current limiting and ensures that the core is reset prior to the primary windings Lpl, Lph being switched.

According to yet another embodiment of the present invention, the isolation barrier unit 115 isolates and drives the signals Q1_D_I, Q2_D_I, Q3_D_I, Q4_D_I, Q5_D_I and Q6_D_I from the respective control unit 105 switching element drive signals Q1_D, Q2_D, Q3_D, Q4_D, Q5_D and Q6_D. The primary side current and voltage inputs I_SENSE_I and V_SENSE_I are sent via the isolation barrier 115 to the inputs I_SENSE and V_SENSE of the control unit 105.

Figure 5:
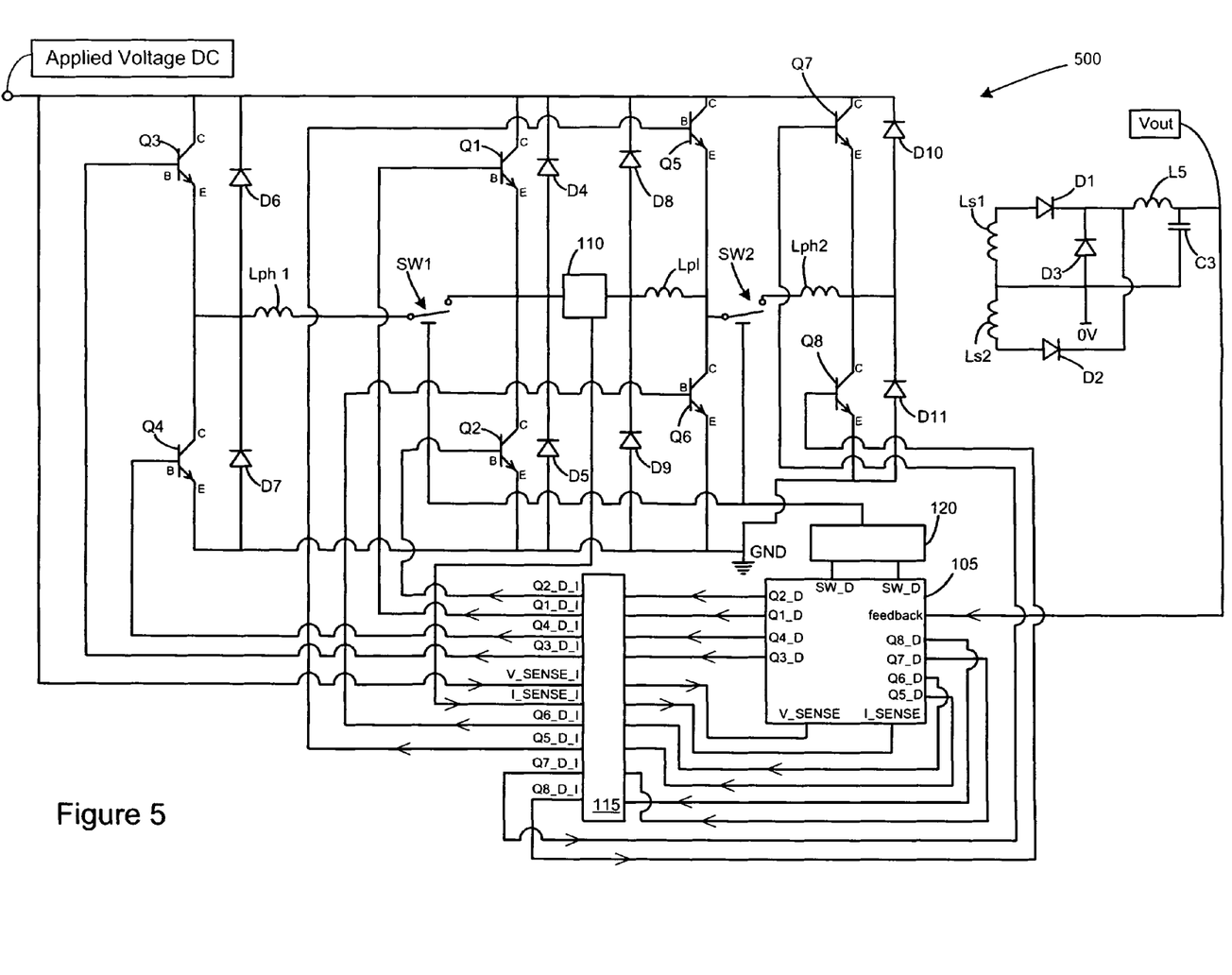
FIG. 5 illustrates another dual drive full bridge circuit for SMPS according to yet another embodiment of the present invention.

FIG. 5 further illustrates a dual drive full bridge circuit 500 according to yet another embodiment of the present invention. According to this embodiment, the auxiliary primary winding Lph may further be split into two halves Lph1, Lph2. The dual drive full bridge circuit 500 uses two more switching elements Q7 and Q8 and a second automatic switch SW2, in addition to the elements described in FIG. 4.

The first half Lph 1 of the auxiliary primary winding Lph may be connected to the switching elements Q3 and Q4 and to the switching device SW1. The second half Lph2 of the auxiliary primary winding Lph is connected to the switching elements Q7 and Q8 and the second switching device SW2. In this configuration, the control unit 105 generates pulse width modulated outputs so as to drive the switching elements Q1, Q2, Q3, Q4, Q5, Q6, Q7 and Q8 via the drive signals Q1_D, Q2_D, Q3_D, Q4_D, Q5_D, Q6_D, Q7_D and Q8_D depending on the line and load conditions that have been sensed. Further, the control unit 105 may provide over-voltage and under-voltage protection on all the output supplies by receiving input parameters feedback from the secondary side.

According to an embodiment, when only the main primary winding Lpl is being driven, the current flows from the switching element Q1 to the main primary winding Lpl to the switching element Q6 and on the subsequent switching cycle, the current flows from the switching element Q5 to the main primary winding Lpl to the switching element Q2. When the series connected primary windings Lph+Lpl is being driven, the switching devices SW1 and SW2 connect the two halves of the auxiliary primary winding Lph in series respectively with the main primary winding Lpl. In this case, the current flows from the switching element Q3 to Lph1 to Lpl to Lph2 to Q8. On the subsequent switching cycle, the current flows from the switching element Q7 to Lph2 to Lpl to Lph1 to Q4. The current sense input I_SENSE provides the current flowing through the primary windings Lpl or first half of the auxiliary primary winding Lph1+main primary winding Lpl+second half of the auxiliary primary winding Lph2 to the control unit 105. Using the current sense input I_SENSE, the control unit 105 provides primary side current limiting and ensures that the core is reset prior to the primary windings being switched together in series. One of the main advantages of this configuration is that it isolates the drive stages of Lpl and Lpl+Lph from one another.

According to yet another embodiment of the present invention, the isolation barrier unit 115 isolates and drives the signals Q1_D_I, Q2_D_I, Q3_D_I, Q4_D_I, Q5_D_I, Q6_D_I, Q7_D_I and Q8_D_I from the respective switching element output drive signals Q1_D, Q2_D, Q3_D, Q4_D, Q5_D, Q6_D, Q7_D and Q8_D. The primary side current and voltage signals I_SENSE_I and V_SENSE_I are sent via the isolation barrier unit 115 to the inputs I_SENSE and V_SENSE of the control unit 105.

According to an embodiment, an AC-DC converter circuit may be connected with any of the SMPS circuits illustrated in FIGS. 1 to 5, in case an AC input is desired. According to an embodiment, the AC-DC circuit may have a noise filter, an AC rectifier with voltage doubler and an auxiliary power circuit.

equivalent DC input voltage conditions. This is applicable to both the single and dual drive circuit topologies as illustrated in FIGS. 1 to 5.

TABLE 1

| RMS INPUT AC VOLTAGE (Acin) | PEAK VOLTAGE (Vm) | ACTUAL PEAK VOLTAGE (V_SENSE) | VOLTAGE DOUBLER (Vdo) | Active Winding |
|---|---|---|---|---|
| 80 | 113.12 | 104 | 197.6 | Lpl |
| 90 | 127.26 | 117 | 222.3 | Lpl |
| 100 | 141.4 | 130 | 247 | Lpl |
| 110 | 155.54 | 143 | 271.7 | Lpl |
| 120 | 169.68 | 156 | 296.4 | Lpl |
| 130 | 183.82 | 169 | 321.1 | Lpl + Lph |
| 140 | 197.96 | 182 | 345.8 | Lpl + Lph |
| 150 | 212.1 | 195 | 370.5 | Lpl + Lph |
| 160 | 226.24 | 208 | 395.2 | Lpl + Lph |
| 170 | 240.38 | 221 | | Lpl |
| 180 | 254.52 | 234 | | Lpl |
| 190 | 268.66 | 247 | | Lpl |
| 200 | 282.8 | 260 | | Lpl |
| 210 | 296.94 | 273 | | Lpl |
| 220 | 311.08 | 286 | | Lpl |
| 230 | 325.22 | 299 | | Lpl |
| 240 | 339.36 | 312 | | Lpl + Lph |
| 250 | 353.5 | 325 | | Lpl + Lph |
| 260 | 367.64 | 338 | | Lpl + Lph |
| 270 | 381.78 | 351 | | Lpl + Lph |
| 280 | 395.92 | 364 | | Lpl + Lph |
| 290 | 410.06 | 377 | | Lpl + Lph |
| 300 | 424.2 | 390 | | Lpl + Lph |
| 310 | 438.34 | 403 | | Lpl + Lph |
| 320 | 452.48 | 416 | | Lpl + Lph |
| 330 | 466.62 | 429 | | Lpl + Lph |
| 340 | 480.76 | 442 | | Lpl + Lph |

Figure 6:
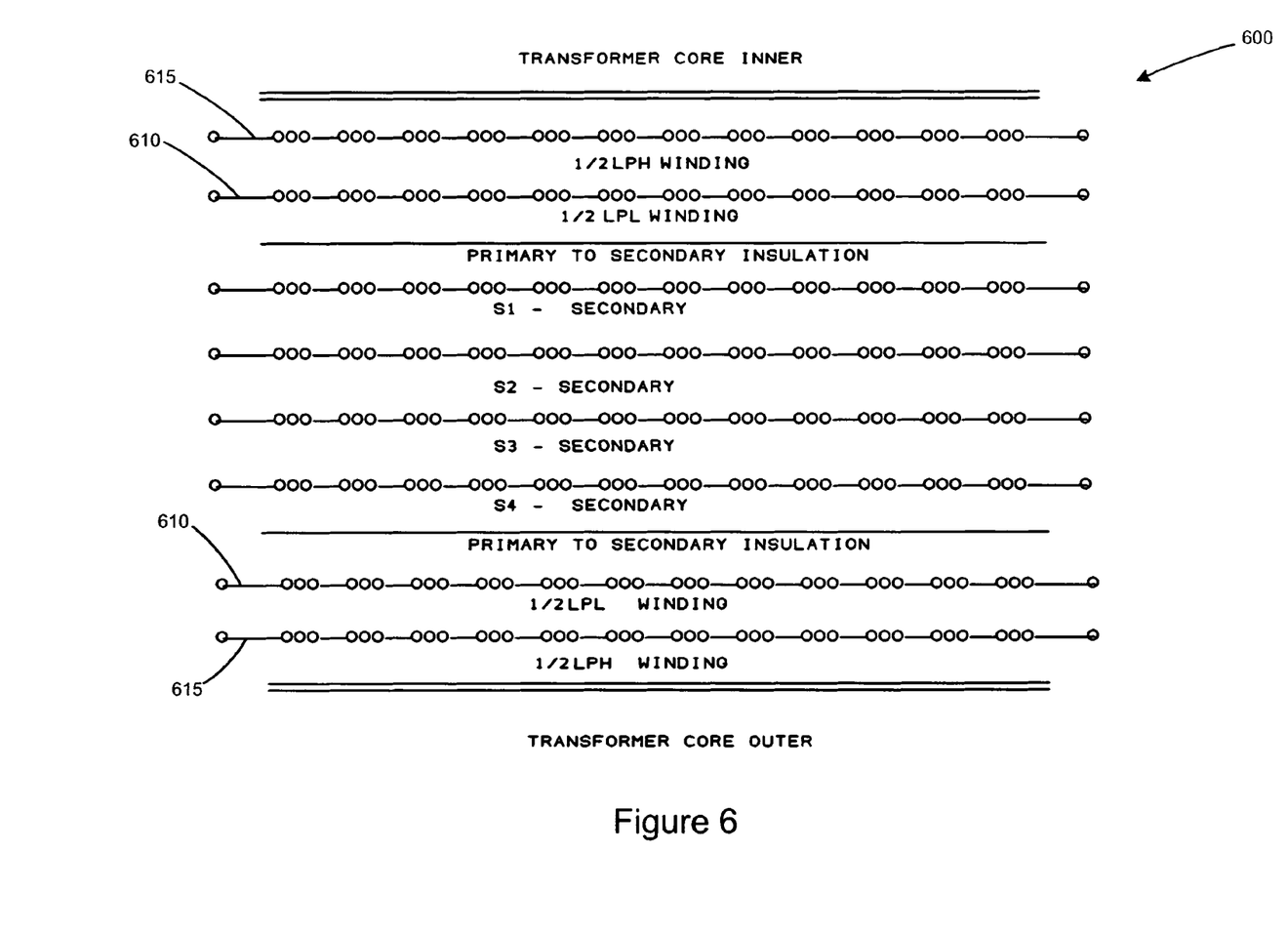
FIG. 6 illustrates a transformer winding topology according to an embodiment of the present invention.

FIG. 6 illustrates a transformer winding topology 600 according to an embodiment of the present invention. In this winding topology, the main primary and the auxiliary primary windings are on separate layers. As illustrated, half of the main primary winding ½ Lpl 610 and half of the auxiliary primary winding ½ Lph 615 may be wound on separate layers and close to the transformer ferrite core. Further, the secondary windings S1, S2, S3 and S4 may be wound next in the transformer. The last two layers on the transformer core are the remaining half main primary winding ½ Lpl 610 and half auxiliary winding ½ Lpl 615 on separate layers. The topology of winding the main primary windings Lpl and auxiliary primary windings Lph on the forward transformer has a critical importance in such circuits to ensure low leakage inductance and effective power transfer. All the terminations in the primary and secondary windings may be present on separate pins to allow for their connection as per the circuit requirements.

Figure 7:
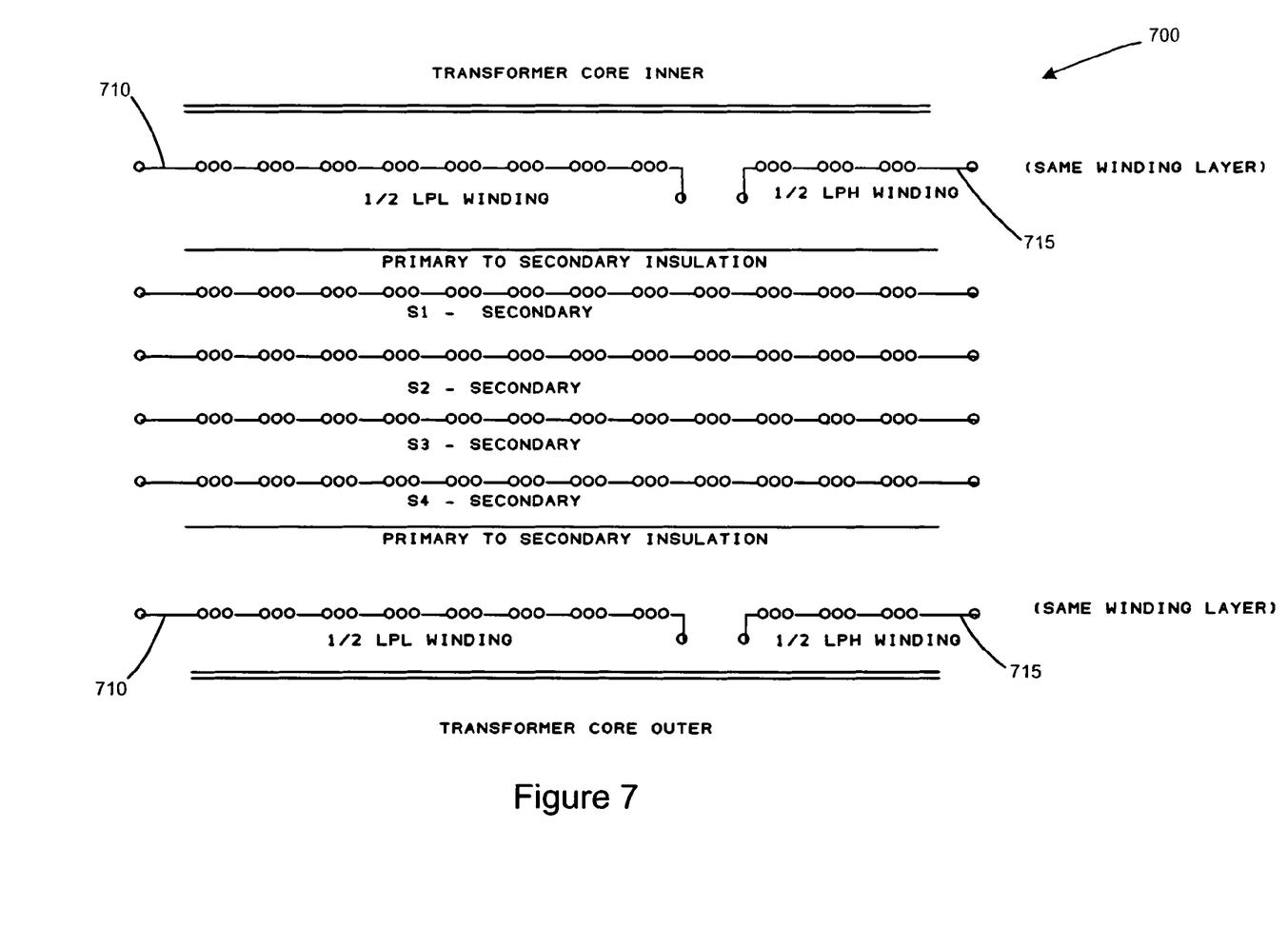
FIG. 7 illustrates another transformer winding topology according to another embodiment of the present invention.

FIG. 7 illustrates a transformer winding topology 700 according to an embodiment of the present invention. The only difference between this topology and the winding topology as illustrated in FIG. 6 is that half of main primary winding ½ Lpl 710 and half of auxiliary primary winding ½ Lph 715 may be wound on the same layer. Further, in this topology, the last winding layer may have half of main primary winding ½ Lpl 710 and half of auxiliary primary winding ½ Lph 715 may again be wound on the same layer as illustrated. All the terminations in the primary and secondary windings may be present on separate pins and connected as per circuit requirements.

According to an embodiment of the invention, a Table 1 is illustrated as a representative table that illustrates how the primary windings Lpl and Lph are switched as per AC and A Root mean square (RMS) value of the applied AC input voltage ACin, is given in column 1 of Table 1. A peak AC voltage Vm (ACin*√2) is given in column 2 of Table 1. The actual peak voltage (DC input voltage), V_SENSE, takes into consideration various factor's such as ripple, diode drops and other impedances and is however somewhat less. This is given in column 3 of Table 1. If a voltage doubler is required, an output voltage, Vdo, is shown in column 4 of Table 1. The active primary winding for each corresponding voltage step in column 3 or column 4 (with voltage doubler), is mentioned in column 5. The typical input voltage range of the main primary winding Lpl may be ranging from 200V to 300V (DC) and with the series connected primary windings Lpl+Lph, the voltage range may be ranging from 300V to 440V (DC).

The present invention has been disclosed with regard to the switched primary single and dual drive configurations for half bridge and full bridge forward converter circuit topologies; however it is not limited to the disclosed topologies only. The number of drive stages and auxiliary primary windings can further be expanded so as to further enhance the dynamic operating range of the power supply without our going beyond the scope of the present invention.

Industrial Application

The present invention provides a power converter that can provide with an enhanced dynamic input voltage range so that appliances such as: computers, television receivers, battery chargers and other sensitive electronic equipments having variable input voltage can operate even in harsh environments without any additional power conditioning equipment. The proposed architecture further ensures that the power supply is more reliable, has a higher overall efficiency, dissipates less heat and costs less to run as compared to the existing systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims are to be embraced within their scope.

I claim:

1. A power converter circuit comprising:
   a ferrite-core forward type transformer having at least a first primary and a second primary windings and at least one secondary winding;
   one or more switching circuits for energizing the first primary winding and optionally the second primary winding, said switching circuits comprising at least two switching elements in each circuit;
   at least one automatic switching device connected in series between a first primary winding and a second primary winding;
   a current sense circuit connected in series with the first primary winding and the automatic switching device; and
   a control unit being connected to the automatic switching device, the control unit being configured to operate the automatic switching device based on voltage detected by the control unit in the input of the power converter circuit, and the control unit being connected to the two or more switching elements of the switching circuit for supplying, based on an input current of the current sense circuit, a drive signal to either of the two switching elements so as to minimize dc bias in the ferrite transformer core.

2. The circuit as claimed in claim 1, wherein said circuit further comprises the two or more switching elements of the one or more switching circuits, each switching element having an emitter, a base and a collector or a source terminal, a gate terminal and a drain terminal.

3. The circuit as claimed in claim 1, wherein the two or more switching elements of the one or more switching circuits are selected from a group comprising bipolar transistor, Field Effect Transistor (FET) or Insulated Gate Bipolar Transistor (IGBT).

4. The circuit as claimed in claim 1, wherein the control unit is further provided with a switch drive circuit configured to drive the automatic switching device.

5. The circuit as claimed in claim 1, wherein the automatic switching device is an electromechanical device.

6. The circuit as claimed in claim 1, wherein the automatic switching device comprises one or more semiconductor devices.

7. The circuit as claimed in claim 1, wherein the control unit is configured to receive input parameters through an isolation barrier unit.

8. The circuit as claimed in claim 1, wherein the first and second primary windings are on same winding layer.

9. The circuit as claimed in claim 1, wherein the first and second primary windings are on different winding layers.

10. A method of controlling the output voltage of a power converter circuit having a ferrite-core forward type transformer, the transformer having a main primary winding, at least one auxiliary primary winding and at least one secondary winding, a switching circuit for energizing the main primary winding and optionally the at least one auxiliary primary winding, said switching circuit comprising at least two switching elements, the method comprises the steps of:
   obtaining input voltage at the main primary winding;
   controlling the at least two switching elements of the switching circuit so as to minimize DC bias in the ferrite transformer core; and
   in response to minimizing the DC bias in the ferrite transformer core, controlling a connection between the main primary winding and the auxiliary primary winding based on the input voltage, such that voltage per turn ratio on the secondary winding remains approximately constant.

11. The method as claimed in claim 10, wherein the steps of controlling the connection includes connecting or disconnecting the main primary winding with at least one auxiliary primary winding in series by an automatic switching device.

12. The method as claimed in claim 10, further comprises the step of sensing a current by a current sense circuit in the main primary winding.

13. The method as claimed in claim 10, further comprises the step of controlling the connection between the main primary winding and the auxiliary primary winding based on the input voltage and the current.

14. A power converter circuit comprising:
   a ferrite-core forward type transformer having a first primary, a second primary and a third primary winding and at least one secondary winding; the first primary winding being located between the second and the third primary windings;
   a first switching circuit for energizing the first, the second and the third primary windings, said first switching circuit comprising of first to fourth switching elements arranged in a full bridge configuration;
   a second switching circuit for energizing the first primary winding, said second switching circuit comprising of fifth to eighth switching elements arranged in a full bridge configuration;
   two automatic switching devices connected in series between the first primary winding, the second primary winding and the third primary winding such that a first automatic switch is connected between the first and the second primary windings and a second automatic switch is connected between the first and the third primary windings;
   a current sense circuit connected in series with the first primary winding such that the same is connected between the first and the second automatic switching devices; and
   a control unit being connected to the first to eighth switching elements and the first and automatic switching device, the control unit being configured to:
   (a) switch ON the first to fourth switching elements of the first switching circuit, switch OFF the fifth to eighth switching elements of the second switching circuit and operate the first and the second automatic switching devices to connect a series combination of the first, the second and the third primary windings in a current flow path; OR
   (b) switch OFF the first to fourth switching elements of the first switching circuit, switch ON the fifth to eighth switching elements of the second switching circuit and operate the first and the second automatic switching devices to connect the first primary winding in a current flow path; and
   (c) supply a drive signal to any of the first to eighth switching elements based on an input current of the current sense circuit so as to minimize dc bias in the ferrite transformer core.

* * * * *